US007777896B2

(12) United States Patent
Ueda et al.

(10) Patent No.: US 7,777,896 B2
(45) Date of Patent: Aug. 17, 2010

(54) SIGNAL PROCESSING APPARATUS AND IMAGE FORMING APPARATUS

(75) Inventors: Tadayuki Ueda, Kokubunji (JP); Hiroyuki Watanabe, Hachioji (JP); Akifumi Isobe, Hidaka (JP); Yoshihito Sasamoto, Hachioji (JP); Takashi Nara, Niiza (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 665 days.

(21) Appl. No.: 11/586,685

(22) Filed: Oct. 26, 2006

(65) Prior Publication Data

US 2007/0177889 A1 Aug. 2, 2007

(30) Foreign Application Priority Data

Jan. 30, 2006 (JP) ............................ 2006-020680

(51) Int. Cl.
*G01B 11/24* (2006.01)

(52) U.S. Cl. ............ 356/601; 250/559.09; 250/559.45; 399/38; 399/45; 399/389; 399/72

(58) Field of Classification Search .................. 399/38, 399/46, 45, 301, 389, 49, 72, 74; 250/208, 250/559.09–559.45

See application file for complete search history.

(56) References Cited

U.S. PATENT DOCUMENTS

| | | | | |
|---|---|---|---|---|
| 5,748,335 | A * | 5/1998 | Honma et al. | 348/572 |
| 6,897,983 | B1 * | 5/2005 | Kawano | 382/260 |
| 2004/0008245 | A1 * | 1/2004 | Hirai et al. | 399/53 |

FOREIGN PATENT DOCUMENTS

| | | |
|---|---|---|
| JP | 2001-265086 | 9/2001 |
| JP | 2003-98791 | 4/2003 |

* cited by examiner

*Primary Examiner*—Gregory J. Toatley, Jr.
*Assistant Examiner*—Iyabo S Alli
(74) *Attorney, Agent, or Firm*—Finnegan, Henderson, Farabow, Garrett & Dunner, L.L.P.

(57) ABSTRACT

A signal processing apparatus comprising: an optical sensor for outputting a detection signal by detecting a surface of a recording medium on which a correction image is to be formed; and a control section configured to obtain a detection signal of the surface of the recording medium with the correction image from which a dominant frequency component has been deleted by making reverse frequency analysis of an analysis signal that has been obtained by making a frequency analysis of a detection signal outputted by the optical sensor detecting the surface of the recording medium on which the correction image it formed.

11 Claims, 12 Drawing Sheets

SIGNAL PROCESSING APPARATUS AND IMAGE FORMING APPARATUS

This application is based on Japanese Patent Application No. 2006-20680 filed on Jan. 30, 2006, the entire content of which is hereby incorporated by reference.

BACKGROUND OF THE INVENTION

1. Field of the Invention

The present invention relates to a signal processing apparatus and an image forming apparatus.

2. Description of the Related Art

In an image forming apparatus such as a color photocopier based on electrophotographic technology, an image is formed by superimposition of toner images of Y (yellow), M (magenta), C (cyan) and K (black) colors. The toner images of these colors are developed on photoreceptor drums of those colors. The toner images of these colors are sequentially transferred onto the annular belt as an intermediate transfer member, and the transferred images are transferred onto recording paper.

In one of the conventional structures, a predetermined density patch and registration mark (pattern) are formed on the intermediate transfer member, and the image is detected by an optical sensor. Based on this detection signal, density and color registration are corrected. In the step of color registration correction, the position of the registration mark of each color is detected by a sensor. Based on the amount of misregistration, the main scanning correction volume, sub-scanning correction volume, overall lateral magnification correction volume, partial lateral magnification correction volume, and skew correction volume (scanning line inclination correction volume) are calculated, whereby color misregistration is corrected.

According to a conventional method (e.g., Patent Document 1), in the color registration correction, the detection signal from the sensor is binarized. The position of the binary data is estimated from the timed interval of writing the registration mark on the intermediate transfer member, and the registration mark is detected within the estimated range plus $\alpha$. The outside of this range is sequentially masked, thereby removing noise caused by a scratch or dust on the intermediate transfer member.

A color registration correction technique has been proposed. According to this proposal, the detection signal from a sensor is filtered by an IIR (infinite Impulse Response) type, FIR (infinite Impulse Response) type and moving average type digital low-pass filters, thereby removing the noise resulting from a scratch or dust on the intermediate transfer member (e.g., Patent Document 2).

[Patent Document 1] Japanese Non-Examined Patent Publication 2001-265086

[Patent Document 2] Japanese Non-Examined Patent Publication 2003-98791

However, the method of removing noise by detection of the registration mark within the conventional predetermined range depends on the signal within the predetermined range to detect the registration mark including the noise component having occurred thereto. This factor has been beyond control because of chronological changes even if there is no problem in the initial period.

If a simple structure is used in the conventional method of removing noise by a low-pass filter, there is concern about the possibility of ensuring accurate detection of the registration mark.

FIG. 14 (*a*) shows the gain of the frequency in the low-order FIR filter. FIG. 14 (*b*) shows the phase component of the frequency in the low-order FIR filter. FIG. 15 (*a*) shows the gain of the frequency in the high-order FIR filter. FIG. 15 (*b*) shows the gain of the phase component in the high-order FIR filter. As shown in FIGS. 14 (*a*) and (*b*), when the FIR filter of a low order is implemented, the filter characteristics are adversely affected. As shown in FIGS. 15 (*a*) and (*b*), if the high-order FIR filter is implemented, a delay in response to the order occurs to the waveform although the filter characteristics are stabilized. This has an adverse effect on the precision in position detection. Such problems have been left unsolved in the conventional art.

The IIR filter improves the filter characteristics by feedback. However, this may lead to a system of poor stability, depending on the design. This makes it necessary to keep track of the chronological changes of an object before designing. Such a problem has been left unsolved in the conventional art.

SUMMARY OF THE INVENTION

The object of the present invention is to provide a signal processing apparatus capable of high-precision removal of noise components from the detection signal of the correction image, without depending on a chronological change.

The first embodiment of the present invention to achieve the aforementioned object includes: an optical sensor for outputting a detection signal by detecting a surface of a recording medium on which a correction image is to be formed; and a control section configured to conduct control steps of: having said optical sensor to detect the surface of the recording medium without the correction image being formed thereon; making a frequency analysis of a first detection signal outputted from said optical sensor detecting the surface of the recording medium without the correction image being formed thereon; extracting a dominant frequency corresponding to the frequency component dominant over other values from a first analysis signal obtained by making the frequency analysis of the first detection signal; having said optical sensor to detect the surface of the recording medium with the correction image formed thereon; making a frequency analysis of a second detection signal outputted from said optical sensor detecting the surface of the recording medium with the correction image being formed thereon; deleting the component of the dominant frequency from a second analysis signal obtained by making the frequency analysis of the second detection signal; and obtaining a detection signal wherein the dominant frequency component has been deleted by making reverse frequency analysis of the second analysis signal from which the dominant frequency component has been deleted.

BRIEF DESCRIPTION OF THE DRAWINGS

FIG. 7 (*b*) is a diagram representing an example of the practical output waveform of the optical sensors 12A and 12B after baseline correction;

FIG. 10 (*b*) is a diagram representing the frequency-analyzed waveform of the ideal sampling data at the time of detecting the registration mark CR;

FIG. 11 (*b*) is a diagram representing the frequency-analyzed waveform of the practical sampling data at the time of detecting the registration mark CR;

FIG. 13 (*b*) is a diagram representing an example of determining the center position of the pattern detection signal having been detected by the optical sensors 12A and 12B;

FIG. 14 (*b*) is a diagram representing the phase component with respect to frequency in a low-order FIR filter;

FIG. 15 (*b*) is a diagram representing the phase component with respect to frequency in a high-order FIR filter.

The present invention ensures high-precision deletion of the noise component from the detection signal of the correction image without depending on chronological changes.

DESCRIPTION OF THE PREFERRED EMBODIMENT

The following describes the details of the embodiments of the present invention with reference to drawings, without the present invention being restricted to the illustrated examples.

Figure 1:
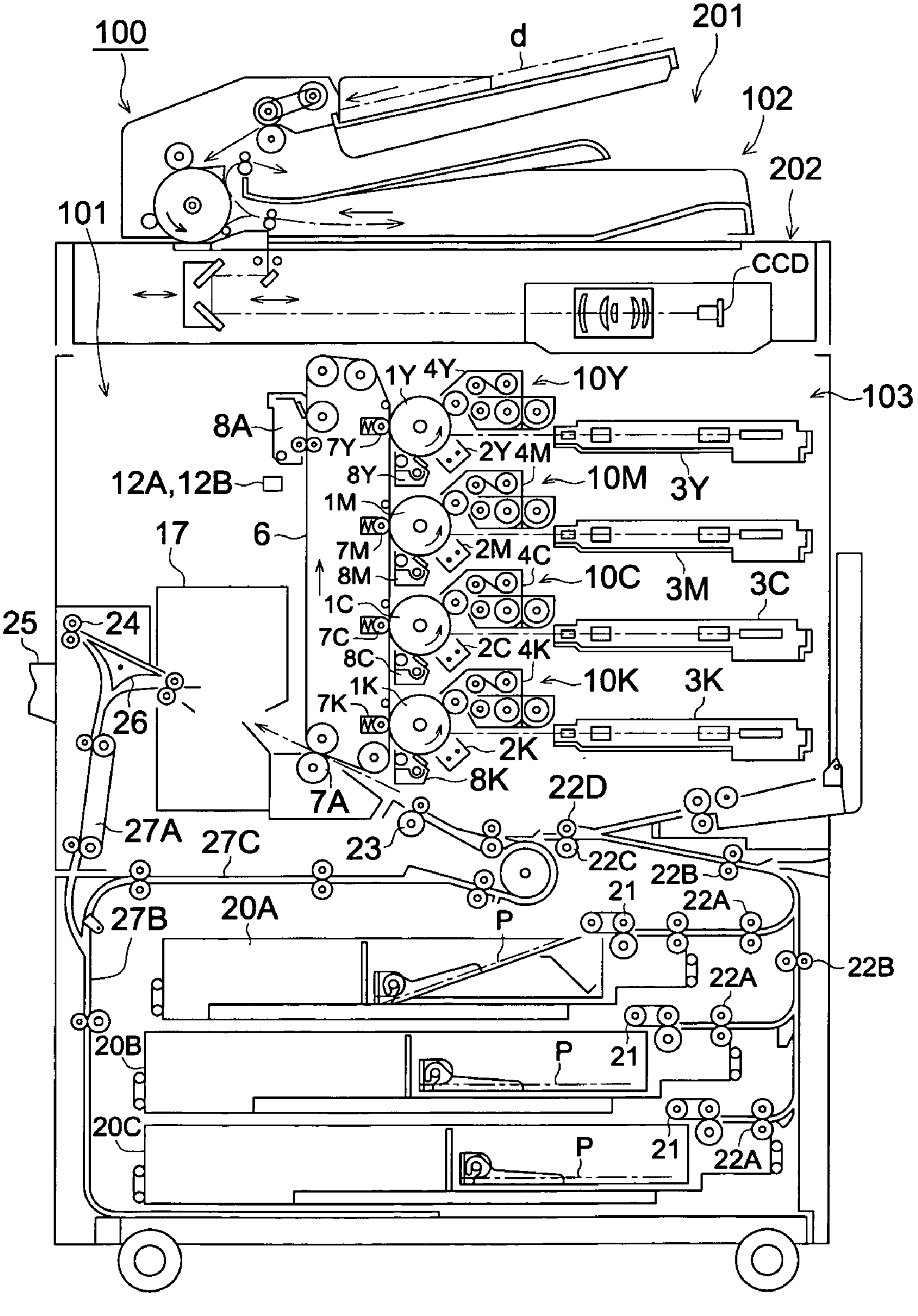
FIG. 1 is a diagram representing the structure of the printing process in a color image forming apparatus 100.

Referring to FIGS. 1 through 5, the following describes the structure of the color image forming apparatus (color photocopier) 100 of the present embodiment. FIG. 1 is a diagram represents the structure of the printing process in a color image forming apparatus 100.

As shown in FIG. 1, the color image forming apparatus 100 contains an image forming apparatus proper 101 and an image reading apparatus 102 above the image forming apparatus proper 101. The image reading apparatus 102 includes an automatic document feed apparatus 201 and a document image scanning exposure apparatus 202.

The document d placed on the document platen of the automatic document feed apparatus 201 is conveyed by a conveyance section, and the images on both sides of the document are scanned and exposed by the optical system of the document image scanning exposure apparatus 202. Then the incoming light reflecting the document image is read by the line image sensor CCD.

The analog image signal having been subjected to photoelectric conversion by the aforementioned line image sensor CCD is subjected to analog processing, analog-to-digital conversion, shading correction and image compression in the image processing section 70 (FIG. 3), and is converted into digital image data. This digital image data is inputted to the image writing units 3Y, 3M, 3C and 3K.

The automatic document feed apparatus 201 is equipped with an automatic two-sided document feed section (not illustrated). The contents of a plurality of documents d (one- or two-sided documents) fed sequentially from the document accommodation table are read at one stroke on a continuous basis by the automatic document feed apparatus 201, and are stored into the image memory 50 (FIG. 5) (by electronic RDH function). This electronic RDH function is employed when a great number of documents are to be copied by the copying function or a great number of documents d are to be sent by the facsimile function.

The image forming apparatus proper 101 is a tandem type color image forming apparatus wherein a plurality of photoreceptor drums 1Y, 1M, 1C and 1K are arranged in a single file, and is provided with an image forming section 103 containing the image forming units 10Y, 10M, 10C and 10K. The photoreceptor drums 1Y, 1M, 1C and 1K are installed on the image forming units 10Y, 10M, 10C and 10K, respectively. The following description assumes that the symbols Y, M, C and K denote yellow, magenta, cyan and black colors, respectively.

Further, the image forming apparatus proper 101 includes an intermediate transfer member 6, a sheet feed section (not illustrated) containing an automatic sheet re-feed mechanism (ADU mechanism) and a fixing apparatus 17 for fixing the toner image.

The image forming unit 10 for forming a Y-color image includes:

a photoreceptor drum 1Y for forming a Y-color toner image; a charging section 2Y for Y-color arranged around the photoreceptor drum 1Y to charge the photoreceptor drum 1Y surface; an image writing unit 3Y for forming an electrostatic latent image by exposing an image pattern to the charged surface; a development apparatus 4Y for forming a toner image by developing the latent image surface by Y-color toner; and a cleaning section 8Y for photoreceptor drum to remove toner subsequent to transfer of the toner image to the intermediate transfer member 6.

Similarly, the image forming unit 10M for forming an M-color image includes: a photoreceptor drum 1M for forming an M-color toner image; a charging section 2M for M-color arranged around the photoreceptor drum 1M; an image writing unit 3M; and a cleaning section 8M for development apparatus 4M and photoreceptor drum.

Similarly, the image forming unit 10C for forming C-color image contains a photoreceptor drum 1C for forming a C-color toner image; a charging section 2C for C-color arranged around the photoreceptor drum 1C; an image writing unit 3C; and a cleaning section 8C for development apparatus 4C and photoreceptor drum.

Similarly, the image forming unit 10K for forming K-color image contains a photoreceptor drum 1K for forming a K-color toner image; a charging section 2K for K-color arranged around the photoreceptor drum 1K; an image writing unit 3K; and a cleaning section 8K for development apparatus 4K and photoreceptor drum.

The charging section 2Y and image writing unit 3Y, charging section 2M and image writing unit 3M, and charging section 2C and image writing unit 3C, and charging section 2K and image writing unit 3K form the electrostatic latent images of these colors on the photoreceptor drums 1Y, 1M, 1C and 1K, respectively.

In response to the skew adjustment signals SSy, SSm and SSc outputted from the control section 15 (to be described later), the image writing units 3Y, 3M, 3C and 3K perform skew correction (image inclination adjustment). Based on the Y-color write data Wy, M-color write data Wm, C-color write data Wc and K-color write data Wk outputted from the control section 15, the image writing units 3Y, 3M, 3C and 3K perform exposure of the photoreceptor drums 1Y, 1M, 1C and 1K, whereby Y-, M-, C- and K-color toner images are formed on the intermediate transfer member 6.

Development by the development apparatuses 4Y, 4M, 4C and 4K is based on the reversal development using the development bias formed by superimposing the a.c. voltage on the d.c. voltage having the same polarity (negative in the present embodiment) as that of the toner to be used.

In the intermediate transfer member 6, the annular belt section is held rotatably, and the toner images of the Y, M, C and K colors formed on photoreceptor drums 1Y, 1M, 1C and 1K, respectively are transferred onto the surface of the aforementioned belt of the intermediate transfer member 6.

Figure 2:
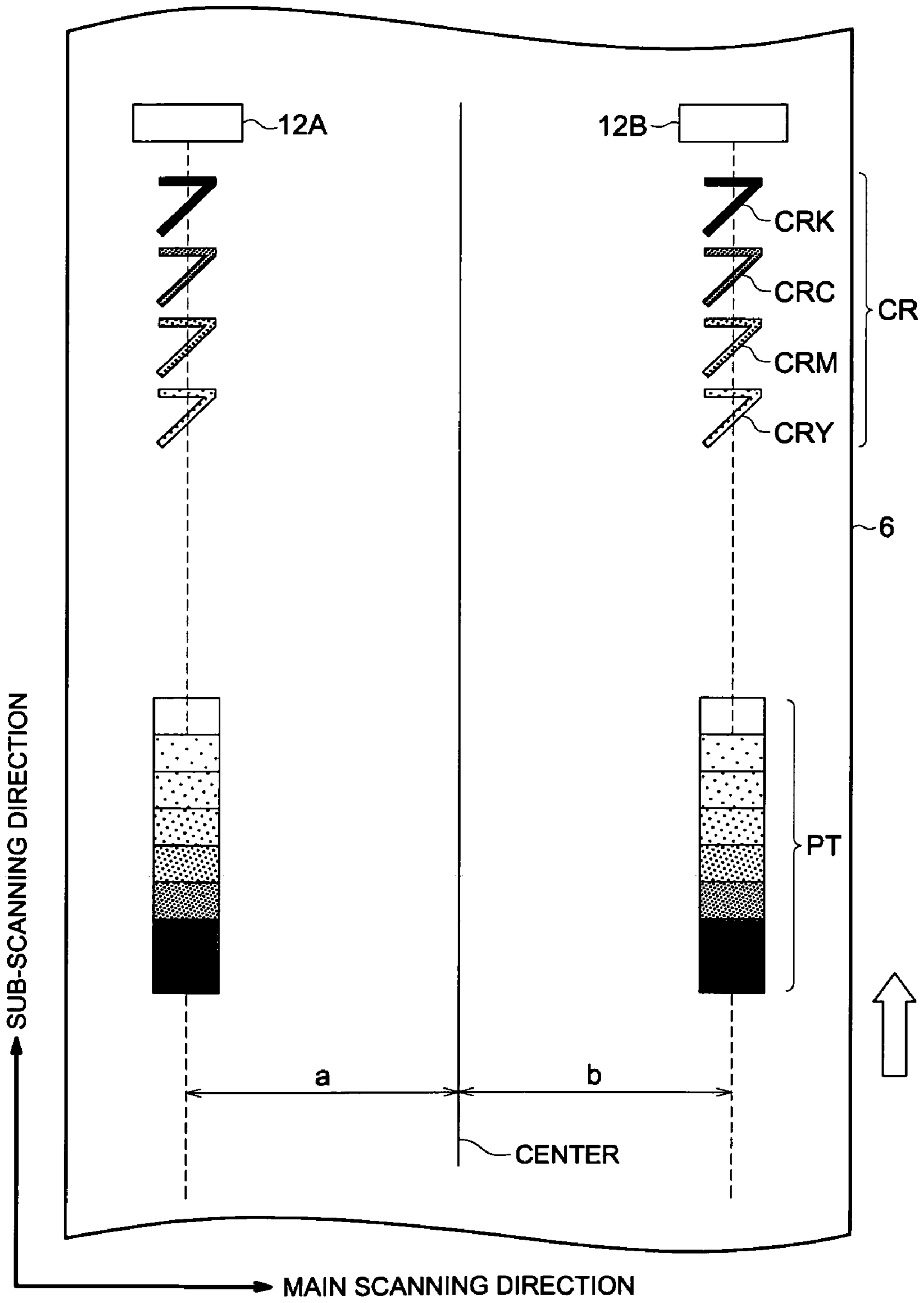
FIG. 2 is a diagram representing the structure of the intermediate transfer member 6 with a correction image being formed, and optical sensors 12A and 12B.

A pair of optical sensors 12A and 12B is installed on both sides of the intermediate transfer member 6, upstream from the cleaning section 8A for the intermediate transfer member. FIG. 2 shows the structure of the intermediate transfer member 6 with a correction image formed thereon, and optical sensors 12A and 12B.

The optical sensors 12A and 12B are reflection type photosensors and others formed by a combination of a light emitting device such as a CCD (charge-coupled Devices) sensor and LED (Laser Emitting Diode) and a light receiving device such as a PD (Photo Diode) (all not illustrated). As shown in FIG. 2, the optical sensors 12A and 12B optically detect the surface status of the intermediate transfer member 6 without a toner image formed thereon at the time of baseline measurement (to be described later). At the time of registration correction and gradation correction (to be described later), these sensors optically detect the surface status of the intermediate transfer member 6 where each color image (registration mark CR hereinafter) including the reference color (K-color in the present embodiment) for registration correction and the image for gradation correction as density correction (density patch PT hereinafter) are formed, by means of the image forming units 10Y, 10M, 10C and 10K. After photoelectric conversion, analog electrical signals are sent to the control section 15 (signal processing section 153).

The following describes the overview of the image forming process by the aforementioned color image forming apparatus 100. The color images formed by the image forming units 10Y, 10M, 10C and 10K are sequentially transferred onto the belt surface of the intermediate transfer member 6 that is rotated and operated (in the process of primary transfer), by the primary transfer rollers 7Y, 7M, 7C and 7K supplied with the primary transfer bias having a polarity (positive in the present embodiment) opposite that of the toner to be used, whereby a superimposed color image (color image: color toner image) is formed. The color image is transferred to the printing paper P from the intermediate transfer member 6.

The printing paper P stored in the sheet feed cassettes 20A, 20B and 20C is fed by the feedout roller 21 and sheet feed roller 22A provided on each of the sheet feed cassettes 20A, 20B and 20C. Passing through the conveyance roller 22B, 22C and 22D, registration roller 23 and others, the printing paper P goes to the secondary transfer roller 7A, whereby the color image is transferred onto one side (front or rear) of the printing paper P (in the process of secondary transfer).

The fixing apparatus 17 applies the process of fixing to the printing paper P with the color image transferred thereon. The printing paper P is sandwiched by the ejection roller 24 and is placed on the exit tray 25 outside the system. The transfer residual toner remaining on the peripheral surfaces of the photoreceptor drums 1Y, 1M, 1C and 1K subsequent to transfer is cleaned by the cleaning sections 8Y, 8M, 8C and 8K for photoreceptor drum, and the system goes to the next image forming cycle.

At the time of duplex image formation, an image is formed on one side (front) of the printing paper P. The printing paper P having been ejected from the fixing apparatus 17 is branched off from the sheet ejection path by a branching section 26. Passing through a circulatory paper feed path 27A located downward, the printing paper P is reversed by the sheet reversing and conveyance path 27B as an automatic sheet re-feed mechanism (ADU mechanism). Passing through the sheet re-feed section 27C, the bundles of the printing paper P having been separated are converged at the conveyance roller 22D.

Passing through the registration roller 23, the printing paper P having been reversed and conveyed goes again to the secondary transfer roller 7A, and a color image (color toner image) is transferred onto the other side (rear) of the printing paper P. The fixing apparatus 17 applies the process of fixing to the printing paper P with the color image transferred thereon. Being sandwiched by the ejection roller 24, the printing paper P is placed on the exit tray 25. In the meantime, after the color image has been transferred onto the printing paper P by the secondary transfer roller 7A, residual toner is removed from the intermediate transfer member 6 separated from the printing paper P, by the cleaning section 8A for the intermediate transfer member.

Figure 3:
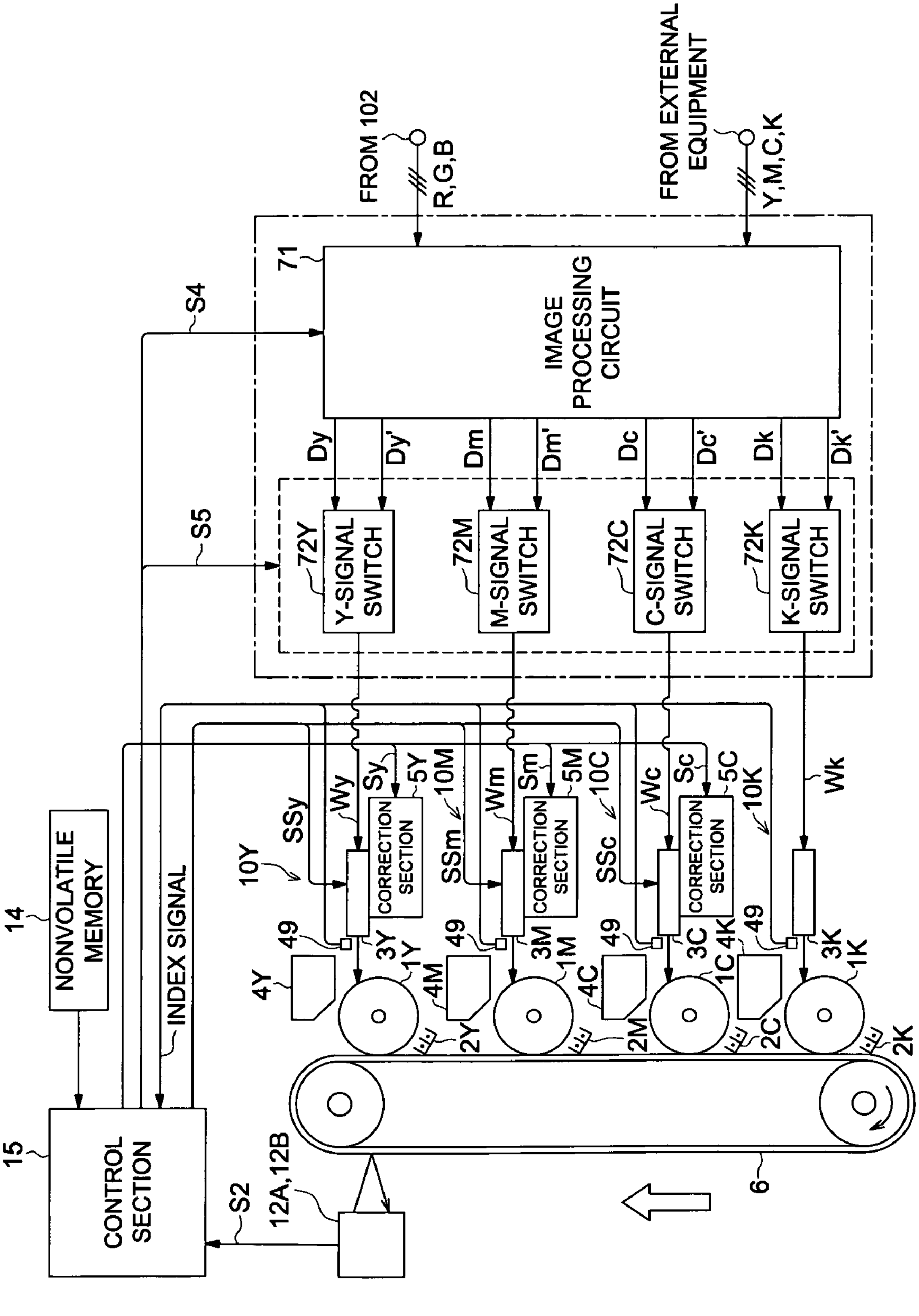
FIG. 3 is a block diagram representing the functional structure of the data processing in a color image forming apparatus 100.
Figure 4:
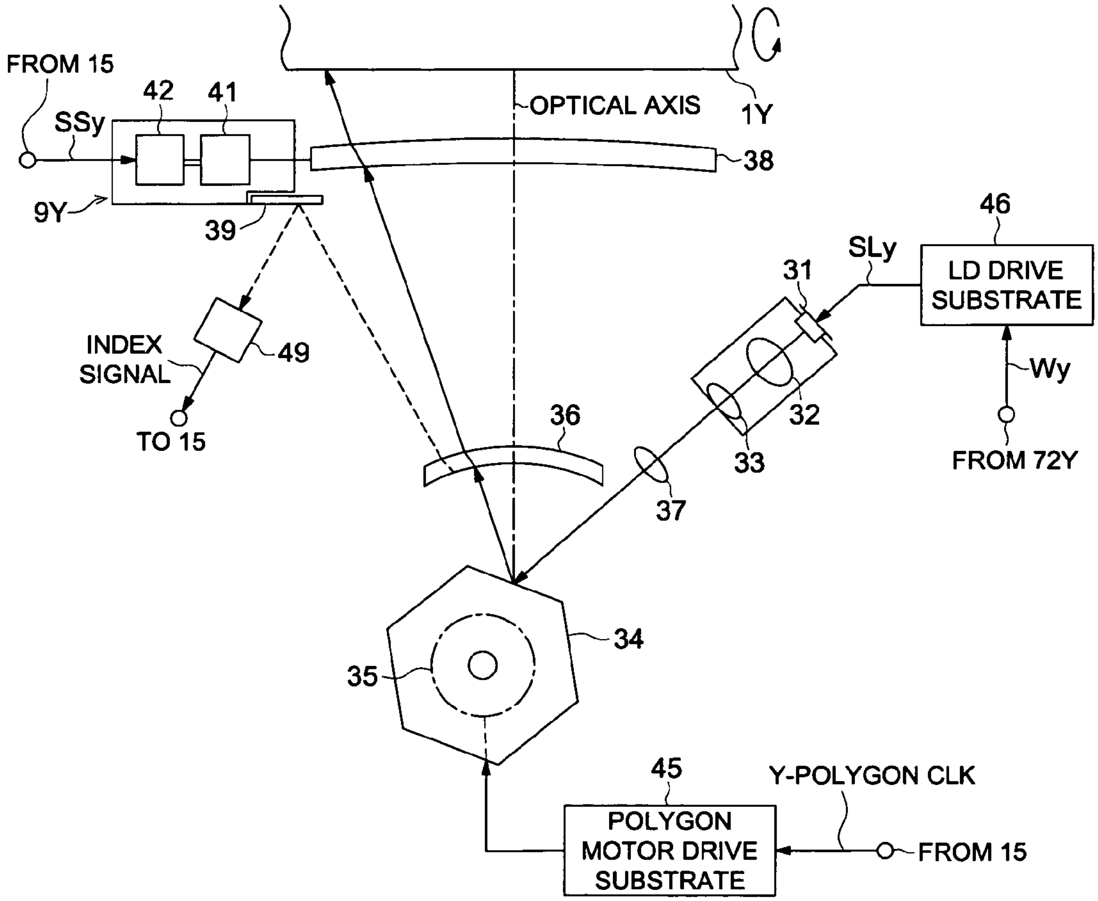
FIG. 4 is a diagram representing the structure of the image writing unit 3Y.

The following describes the functional structure of the data processing in a color image forming apparatus 100, with reference to FIG. 3 and FIG. 4. FIG. 3 represents the functional structure of the data processing in a color image forming apparatus 100.

As shown in FIG. 3, the color image forming apparatus 100 is provided with the correction sections 5Y, 5M and 5C, optical sensors 12A and 12B, nonvolatile memory 14, control section 15, laser index sensor 49 and image processing section 70, in addition to the components related to printing in FIG. 1.

In response to the position outputted from the control section 15, the correction sections 5Y, 5M and 5C adjust the horizontal inclination of the image writing units 3Y, 3M and 3C, respectively.

The nonvolatile memory 14 stores various types of data generated at the time of implementing various programs to be executed by the control section 15. The nonvolatile memory 14 stores the registration correction volume (registration correction LUT), gradation correction volume (gradation correction LUT), magnification correction LUT, and correction image data in advance.

The control section 15 uses a program or hardware to provide administrative control of the color image forming apparatus 100.

The control section 15 controls the image forming units 10Y, 10M, 10C and 10K in such a way that the toner images of Y, M, C and K colors are formed on the intermediate transfer member 6, based on the Y-color write data Wy, M-color write data Wm, C-color write data Wc and K-color write data Wk outputted from the image processing section 70.

The control section 15 outputs the image processing control signal S4 to the image processing circuit 71, and controls the operation of the image processing circuit 71.

The control section 15 outputs the write select signal S5 to the Y-signal switch 72Y, M-signal switch 72M, C-signal switch 72C and K-signal switch 72K, and controls them.

The control section 15 outputs the position correction signals Sy, Sm and Sc to the correction sections 5Y, 5M and 5C, respectively, and adjusts the horizontal inclination of the image writing units 3Y, 3M and 3C.

The control section 15 outputs the skew adjustment signals SSy, SSm and SSc to the image writing units 3Y, 3M and 3C, and performs skew adjustment of the image writing units 3Y, 3M and 3C.

In response to the INDEX signal of each color inputted from the laser index sensor 49, the control section 15 generates the output start timing for printing data.

What is called the output start timing in this case is the timing for the Y-signal switch 72Y, M-signal switch 72M, C-signal switch 72C and K-signal switch 72K to start outputting the write data Wy, Wm, Wc and Wk to the image writing units 3Y, 3M, 3C and 3K.

When the instruction to change the printing magnification factor (e.g., printing magnification factor for the rear at the time of double-sided printing) has been inputted through the operation section 16 (to be described later), the control section 15 sets the rotational speed of the process speed or polygon mirror 34 based on the aforementioned changed printing magnification factor and magnification correction LUT (Look Up Table), and performs the step of printing based on the aforementioned changed printing magnification factor.

The magnification correction LUT in this case refers to the data representing the correspondence between the printing magnification factor and the rotational speed of the process speed or polygon mirror 34. This data is stored in the non-volatile memory 14 in advance.

Figure 6:
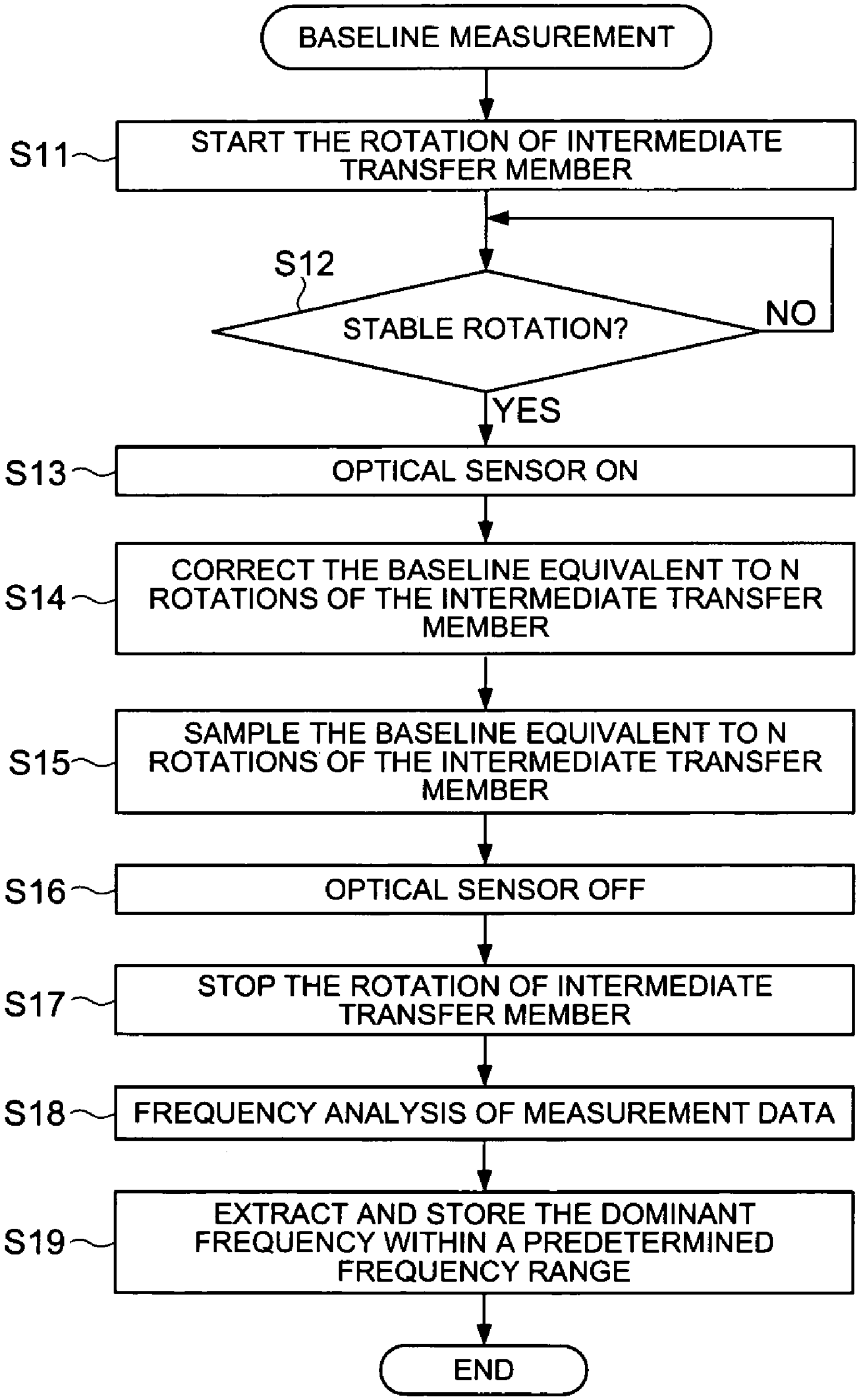
FIG. 6 is a flowchart representing the process of baseline measurement.
Figure 9:
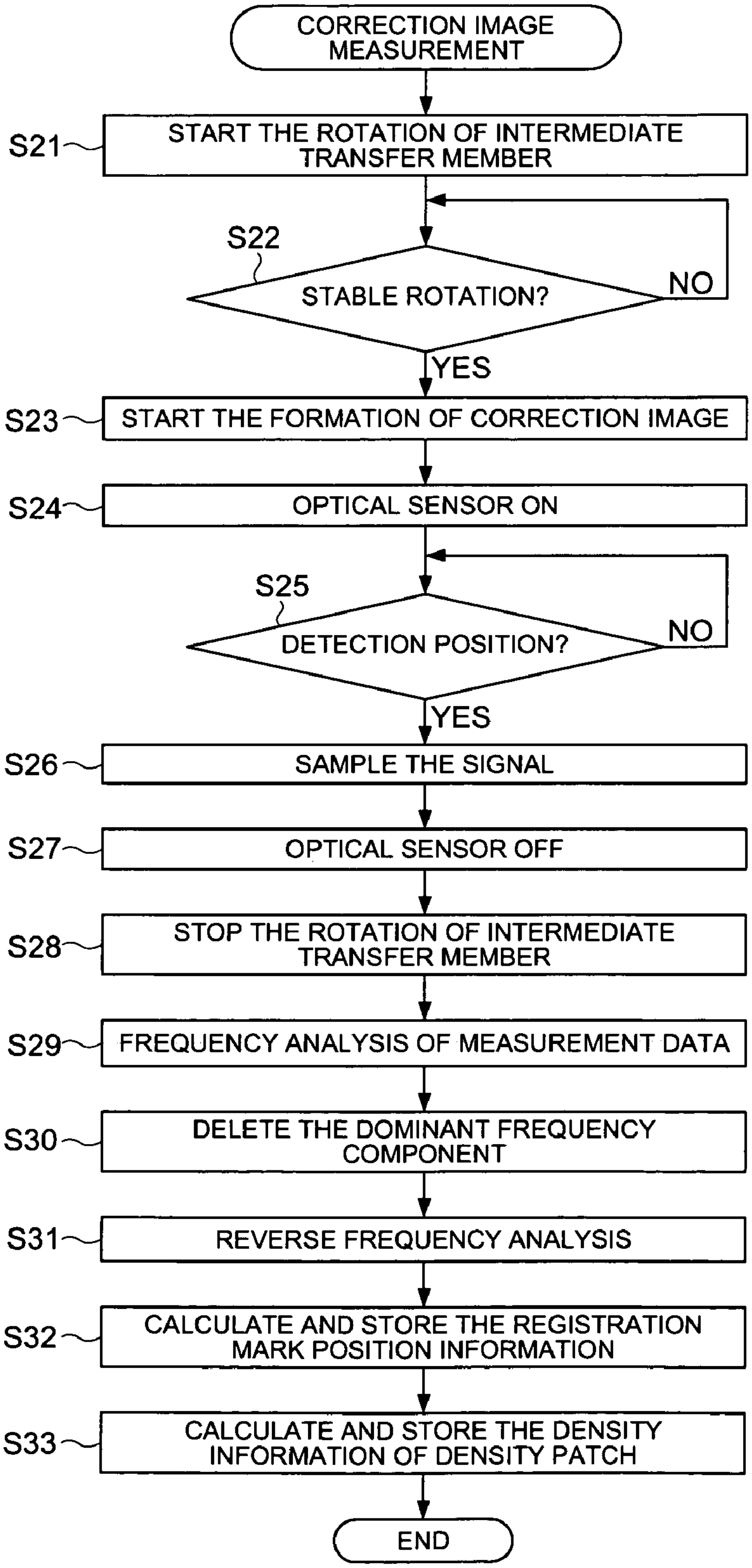
FIG. 9 is a flowchart representing the process of measuring the correction image.

The control section 15 provides control in such a way as to perform baseline measurement and correction image measurement (processing shown in the flowchart given in FIG. 6 and FIG. 9).

Each of the laser index sensors 49 detects the beam light emitted from the image writing units 3Y, 3M, 3C and 3K and output each INDEX signal to the control section 15.

The image processing section 70 includes an image processing circuit 71, Y-signal switch 72Y, M-signal switch 72M, C-signal switch 72C and K-signal switch 72K.

In response to the image processing control signal S4, the image processing circuit 71 applies the process of color conversion to the R, G and B signals related to the R-, G- and B-color components of the color image read by the image reading apparatus 102, and outputs the image data Dy, Dm, Dc and Dk to the Y-signal switch 72Y, M-signal switch 72M, C-signal switch 72C and K-signal switch 72K.

For Y, M, C and K signals inputted from the external device such as a printer, the image processing circuit 71 outputs the image data Dy', Dm', Dc' and Dk' to the Y-signal switch 72Y, M-signal switch 72M, C-signal switch 72C, and K-signal switch 72K, respectively after screen processing of each of the Y, M, C and K signals based on the image processing control signal S4.

In response to the write select signal S5, the Y-signal switch 72Y, M-signal switch 72M, C-signal switch 72C and K-signal switch 72K selects either the image data Dy or image data Dy', either the image data Dm or image data Dm', either the image data Dc or image data Dc' and either the image data Dk or image data Dk' and outputs them to the image writing units 3Y, 3M, 3C and 3K.

Referring to FIG. 4, the following describes the structure of the image writing unit 3Y. FIG. 4 shows the structure of the image writing unit 3Y. The following description also applies to the image writing units 3M, 3C and 3K for other colors than Y (i.e. M, C and K colors).

As shown in FIG. 4, the image writing unit 3Y contains a semiconductor laser beam source 31, collimator lens 32, auxiliary lens 33, polygon mirror 34, polygon motor 35, f(θ) lens 36, CY1 lens 37 for mirror surface image formation, CY2 lens 38 for drum surface image formation, reflecting plate 39, polygon motor drive substrate 45 and LD (Laser Diode) drive substrate 46.

The LD drive substrate 46 causes the write data Wy to undergo the process of PWM (Pulse Width Modulation), and outputs the laser drive signal SLy of a predetermined pulse width subsequent to pulse width modification, to the semiconductor laser beam source 31.

In response to the laser drive signal SLy inputted outputted from a control section 15 (main scanning start timing control section 1551 and sub-scanning start timing control section 1552, gradation control section 1556), the semiconductor laser beam source 31 outputs the Y-color laser beam to the collimator lens 32. The Y-color laser beam outputted from the semiconductor laser beam source 31 is shaped into a predetermined beam light by means of a collimator lens 32, auxiliary lens 33 and CY1 lens 37 for mirror surface image formation.

The polygon mirror 34 ensures that the laser beam having been shaped by the collimator lens 32 is deflected in the direction of main scanning. In response to the Y polygon CLK inputted from the control section 15 (pixel clock cycle control section 1553), the polygon motor drive substrate 45 issues the drive signal for driving the polygon mirror 34 to the polygon motor 35. The polygon motor 35 drives the polygon mirror 34 based on the aforementioned drive signal inputted from the polygon motor drive substrate 45.

The f(θ) lens 36 and CY2 lens 38 for drum surface image formation ensure that the beam light deflected by the polygon mirror 34 forms an image on the surface of the photoreceptor drum 1Y. This step allows an electrostatic latent image to be formed on the surface of the photoreceptor drum 1Y.

The skew adjustment means 9Y contains an adjusting gear unit 41 and an adjustment motor 42 for driving the adjusting gear unit 41. The adjusting gear unit 41 is connected with the CY2 lens 38 for drum surface image formation. In response to the skew adjustment signal SSy inputted from the control section 15 (image forming unit drive section 1555), the adjustment motor 42 drives the adjusting gear unit 41, and adjusts the vertical inclination of the CY2 lens 38 for drum surface image formation connected to the adjusting gear unit 41. This procedure permits skew adjustment.

Further, when part of the beam light reflected by the polygon mirror 34 has been reflected by the reflecting plate 39 to enter the laser index sensor 49, the laser index sensor 49 sends the INDEX signal to the control section 15.

Figure 5:
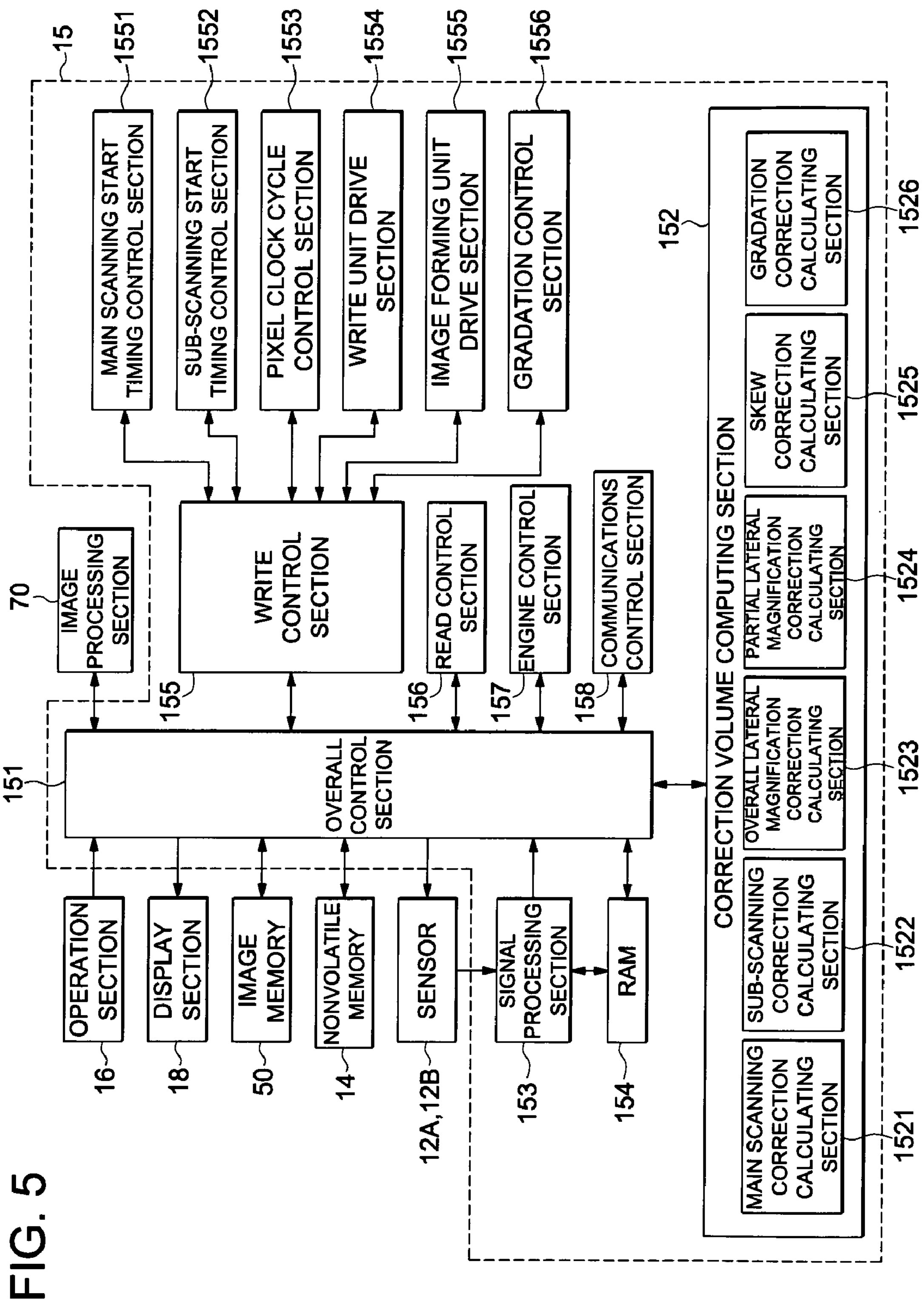
FIG. 5 is a diagram representing the structure of controlling the color image forming apparatus 100.

Referring to FIG. 5, the following describes the structure of controlling the color image forming apparatus 100. FIG. 5 shows the structure of controlling the color image forming apparatus 100.

As shown in FIG. 5, the control section 15 is provided with an overall control section 151, correction volume computing section 152, signal processing section 153, RAM (Random Access Memory) 154, write control section 155, reading control section 156, engine control section 157, communications control section 158, main scanning start timing control section 1551, sub-scanning start timing control section 1552, pixel clock cycle control section 1553, write unit drive section 1554, and image forming unit drive section 1555.

The overall control section 151 has a built-in CPU (Central Processing Unit), RAM and ROM (Read Only Memory). In the overall control section 151, various types of programs stored in the ROM are read out and are displayed on the RAM. Various components of the control section 15 are controlled through collaboration with the program being displayed, and various forms of processing are carried out.

The overall control section 151 measures the baseline of the intermediate transfer member 6 by executing the step of measuring the baseline shown in FIG. 6, and allows the signal processing section 153 to discretize the detection signal of the intermediate transfer member 6 obtained from the optical sensors 12A and 12B. Then the sampling data is subjected to frequency analysis. The dominant frequency of the voltage within a predetermined frequency range is extracted and is stored in the nonvolatile memory 14. By executing the step of measuring the correction image shown in FIG. 9, the overall control section 151 allows a correction image to be formed on the intermediate transfer member 6. It also permits the signal processing section 153 to discretize the detection signal of the intermediate transfer member 6, and the component of the dominant frequency stored in the nonvolatile memory 14 is deleted from the signal, which is subjected to reverse frequency analysis. The position information of the registration mark CR and density information of density patch PT are obtained from the waveform, and are stored in the nonvolatile memory 14.

The dominant frequency is defined as a frequency having a frequency component by far the greater than that of other frequencies such as in noise, when a signal is subjected to frequency analysis.

At the time of registration correction, based on the position information of the registration mark CR stored in the nonvolatile memory 14, the overall control section 151 allows the correction volume computing section 152 to calculate the registration correction volume (main scanning correction volume, sub-scanning correction volume, overall lateral magnification correction volume, partial lateral magnification correction volume and skew correction volume). The registration correction volume is stored in the nonvolatile memory 14. At the time of gradation correction, based on the density information of the density patch PT stored in the nonvolatile memory 14, the overall control section 151 allows the correction volume computing section 152 to calculate the gradation correction volume. The gradation correction volume is stored in the nonvolatile memory 14.

At the time of reading an image, the overall control section 151 controls an image reading apparatus 102 through a reading control section 156, and reads out the document image. The image is processed by the image processing section 70, and is stored in the image memory 50.

The overall control section 151 receives various forms of information such as image data from the external device through the communications control section 158.

The overall control section 151 drives and controls the image writing units 3Y, 3M, 3C and 3K, and image forming units 10Y, 10M, 10C and 10K through the write control section 155 at the time of image formation. The feedout roller 21, sheet feed roller 22A, conveyance roller 22B, 22C and 22D, registration roller 23, intermediate transfer member 6, fixing apparatus 17 are driven through the engine control section 157. At the time of image formation, based on the registration correction volume and gradation correction volume stored in the nonvolatile memory 14, the overall control section 151 in particular, controls the main scanning start timing control section 1551, sub-scanning start timing control section 1552, pixel clock cycle control section 1553, write unit drive section 1554, image forming unit drive section 1555 and gradation control section 1556, thereby setting the rotational speed of the process speed or polygon mirror 34 resulting from a change in the printing magnification factor. Thus, at the time of image formation, the image data stored in the image memory 50, or the image data received from the external device through the communications control section 158 is used to form a color image on the printing paper, which is then fixed in position. Then the printing paper is ejected from the exit tray 25.

For the registration correction volume in this case, for example, the data representing the correspondence between the misregistration of the registration marks CR of other colors with respect to the registration mark CR of the reference color, and the output-start correction timing is stored into the nonvolatile memory 14 as the registration correction LUT. Further, for the gradation correction volume, the data for the correspondence between the magnitude of the density signal of the original image and the magnitude of the density signal inputted into the image writing units 3Y, 3M, 3C and 3K is stored as the gradation correction LUT in the nonvolatile memory 14.

The correction volume computing section 152 includes a main scanning correction calculating section 1521, sub-scanning correction calculating section 1522, overall lateral magnification correction calculating section 1523, partial lateral magnification correction calculating section 1524, skew correction calculating section 1525, gradation correction calculating section 1526. Various forms of correction volume are calculated in response to the instruction of the overall control section 151.

Based on the misregistration of the registration mark CR of other colors with respect to the registration mark CR of the reference color, and the registration correction LUT, the main scanning correction calculating section 1521 calculates the main scanning correction volume for connecting the output start timing in the direction of main scanning. The result of the aforementioned calculation is outputted to the control section 15.

Based on the misregistration of the registration mark CR of other colors with respect to the registration mark CR of the reference color, and the registration correction LUT, the sub-scanning correction calculating section 1522 calculates the sub-scanning correction volume for connecting the output start timing in the direction of sub-scanning. The result of the aforementioned calculation is outputted to the control section 15.

Based on the misregistration of the registration mark CR of other colors with respect to the registration mark CR of the reference color, and the registration correction LUT, the overall lateral magnification correction calculating section 1523 calculates the overall lateral magnification correction volume for correcting the frequency of the pixel clock signal so as to remove deviations in overall lateral magnification. The result of the aforementioned calculation is outputted to the control section 15.

Based on the misregistration of the registration mark CR of other colors with respect to the registration mark CR of the reference color, and the registration correction LUT, the partial lateral magnification correction calculating section 1524 calculates the partial lateral magnification correction volume for correcting the horizontal inclination of the image writing units 3Y, 3M and 3C so as to remove deviations in partial lateral magnification. The result of the aforementioned calculation is outputted to the control section 15.

Based on the misregistration of the registration mark CR of other colors with respect to the registration mark CR of the reference color, and the registration correction LUT, the skew correction calculating section 1525 calculates the skew correction volume for correcting the vertical inclination of the CY2 lens 38 of the drum surface image formation so as to remove skew deviation. The result of the aforementioned calculation is outputted to the control section 15.

The main scanning start timing control section 1551, sub-scanning start timing control section 1552, pixel clock cycle control section 1553, write unit drive section 1554, image forming unit drive section 1555, and gradation control section 1556 perform the following processes of registration correction (main scanning correction, sub-scanning correction, overall lateral magnification correction, partial lateral magnification correction, and skew correction) and gradation correction.

In response to the output start correction timing in the aforementioned main scanning inputted from the overall control section 151, the main scanning start timing control section 1551 adjusts the output start timing in the main scanning direction of each color and adjusts the write position in the main scanning direction of each color (in the main scanning correction process).

In response to the output start correction timing in the aforementioned sub-scanning inputted from the overall control section 151, the sub-scanning start timing control section 1552 adjusts the output start timing in the sub-scanning direction of each color and adjusts the write position in the sub-scanning direction of each color (in the sub-scanning correction process).

Based on the aforementioned overall lateral magnification correction volume inputted from the overall control section 151, the pixel clock cycle control section 1553 corrects the frequency of the pixel clock signal, and corrects the magnification of each of Y, M, C and BK (in the overall lateral magnification correction process).

Based on the aforementioned partial lateral magnification correction volume inputted from the overall control section 151, the write unit drive section 1554 corrects the horizontal inclination of each of the image writing units 3Y, 3M and 3C (in the partial lateral magnification correction process).

Based on the aforementioned skew correction volume inputted from the overall control section 151, the image forming unit drive section 1555 corrects the vertical inclination of the CY2 lens 38 for drum surface image formation for each color (in the skew correction process).

Based on the aforementioned gradation correction volume inputted from the overall control section 151, the gradation control section 1556 corrects the laser drive signal inputted into the image writing units 3Y, 3M, 3C and 3K (in the gradation correction process).

The operation section 16 contains a key pad with various keys and outputs the various forms of input signals to the overall control section 151. The display section 18 has a display apparatus such as an LCD (Liquid Crystal Display), and displays various forms of display data inputted from the overall control section 151. The operation section 16 and display section 18 can be arranged integrally as a touch panel.

Referring to FIG. 2, the following describes the correction image to be formed on the intermediate transfer member 6. As shown in FIG. 2, registration mark CR and density patch PT as correction images are arranged uniformly on the right and left sides at the center of the image area on the intermediate transfer member 6. The arrangement position thereof corresponds to that of the optical sensors 12A and 12B. The registration mark CR contains the registration mark CRY, CRM, CRC, CRK of Y, M, C and K colors.

In this case, the registration mark CR is defined as a mark formed by a line segment parallel to the main scanning direction of the intermediate transfer member 6, and a line segment forming a predetermined angle (e.g., 45 degrees) with respect to the main scanning direction. The mark of this form allows deviations in the main scanning direction and the sub-scanning direction to be detected in terms of one mark. FIG. 2 shows that one registration mark CR is formed on each the right and left of the belt of the intermediate transfer member 6 for each color in the longitudinal direction. Without being restricted thereto, the number of the registration marks CR can be set as desired. The accuracy of color misregistration correction can be improved by increasing the number of the registration mark CR.

The density patch PT indicates a plurality of density patches wherein the density exhibits a stepwise change. Each density value is calculated from the average value of the signal for reading the patch of each density.

Referring to FIG. 6 through FIG. 13, the following describes the operation of the color image forming apparatus 100. The baseline measurement will be described first with reference to FIG. 6 through FIG. 8. FIG. 6 shows the flow in the baseline measurement step.

In the color image forming apparatus 100, for example, baseline measurement is carried out by the overall control section 151 in response to the instruction given by the user through the operation section 16 to start baseline measurement.

As shown in FIG. 6, the intermediate transfer member 6 starts rotation through the engine control section 157 (Step S11). The rotational speed of the intermediate transfer member 6 is measured by the detection of the speed sensor (not illustrated) and a decision is made to see whether or not the rotational speed is stable (Step S12). If the rotational speed is not stable (Step S12: No), the system goes back to Step S12. The rotational speed of the intermediate transfer member 6 is measured again by the detection of the speed sensor (not illustrated). A decision is made to see whether or not the rotational speed is stable (Step S12). If the rotational speed is stable (Step S12: Yes), the optical sensors 12A and 12B are turned on, and the system starts detection of the surface of the intermediate transfer member 6 (Step S13).

Then the baseline correction equivalent to the number N of rotations (where N denotes a predetermined natural number) is carried out (Step S14). The baseline correction can be defined as follows: When the intermediate transfer member 6 is used for a long time, a change occurs to the suffice roughness of the intermediate transfer member 6. This will lead to a big change in the output voltage of the optical sensors 12A and 12B, with the result that the amount of toner deposition in the density patch to be described later cannot be measured accurately. In order to ensure that the variation in the amount of toner deposition on the intermediate transfer member 6 is kept below a predetermined level, correction is performed prior to the formation of a correction image (to be described later). This step of correction is referred to as the baseline correction.

In the baseline correction, the optical sensors 12A and 12B are used to detect the area of the intermediate transfer member 6 free of toner deposition, i.e., the entire circumference of the so-called baseline, whereby the characteristics are identified. The amount of the toner deposition is kept constant by variable control of the circumferential speed ratio of the development apparatuses 4Y, 4M, 4C and 4K as appropriate. Similarly, subsequent to detection of the baseline, the amount of light supplied from the light emitting device (LED) of the optical sensors 12A and 12B is adjusted to ensure that the amplitude of the output voltage of the optical sensors 12A and 12B will be kept within a predetermined range.

After baseline correction, the surface of the intermediate transfer member 6 equivalent to the number N of rotations is detected by the optical sensors 12A and 12B, and the detection signal of the optical sensors 12A and 12B is discretized by the signal processing section 153 and the sampling data thereof is stored in the RAM154 (Step S15).

Figure 7:
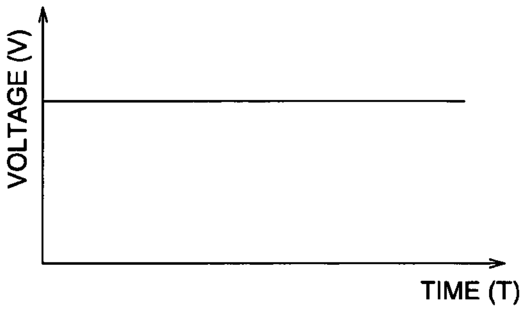
FIG. 7 (*a*) is a diagram representing the ideal output waveform of the optical sensors 12A and 12B after baseline correction.
Figure 7:
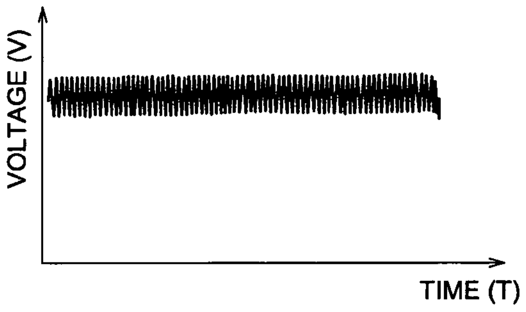

FIG. 7 (*a*) shows the ideal output waveform of the optical sensors 12A and 12B subsequent to baseline correction. FIG. 7 (*b*) shows an example of the practical output waveform of the optical sensors 12A and 12B subsequent to baseline correction. As shown in FIG. 7 (*a*), the ideal output voltage of the optical sensors 12A and 12B is kept constant with respect to time. In actual practice, the waveform given in FIG. 7 (*b*) appears.

Then the optical sensors 12A and 12B are turned off and detection of the surface of the intermediate transfer member 6 terminates (Step S16). Then the rotation of the intermediate transfer member 6 is terminated through the engine control section 157 (Step S17). The sampling data of the baseline stored in the RAM154 is subjected to frequency analysis (Step S18). To put it more specifically, FFT (Fast Fourier Transform: fast Fourier transformation) is applied to the sampling data of the baseline as a voltage component with respect to time, thereby obtaining the waveform of the frequency component (amplitude) with respect to frequency.

For the data subsequent to frequency analysis, the dominant frequency component as noise within a predetermined frequency is identified to identify the noise due to a scratch or dust on the intermediate transfer member 6. The dominant frequency thereof is extracted, and is stored in the nonvolatile memory 14 (Step S19). The process of baseline measurement is now complete.

Figure 8:
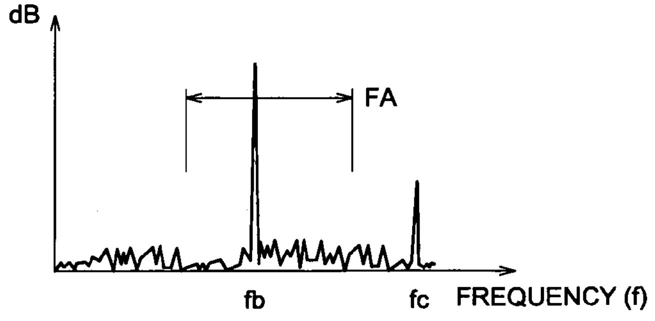
FIG. 8 is a diagram representing an example of the waveform of the baseline sampling data after frequency analysis.

FIG. 8 represents an example of the waveform of the baseline sampling data after frequency analysis. For the frequency component with respect to frequency, as shown in FIG. 8, in the frequency range FA wherein the noise due to a scratch or dust on the intermediate transfer member 6 is likely to occur, the dominant frequency is assumed as the frequency fb wherein noise due to a scratch or dust on the intermediate transfer member 6 has occurred. The frequency fc of the electrical noise component is not within the frequency range FA, and is not identified as the dominant frequency.

The range wherein the noise due to a scratch or dust on the intermediate transfer member 6 may occur is empirically determined and is set as the predetermined frequency range. Further, the dominant frequency is assumed as a frequency component within the predetermined frequency range. For example, it is assumed as the frequency of the frequency components having exceeded a predetermined threshold value. The number of the dominant frequencies or predetermined frequency ranges is not restricted to one. A plurality of dominant frequencies or predetermined frequency ranges can be employed.

Referring to FIG. 9 through FIG. 13, the following describes the correction image measurement to be performed subsequent to baseline measurement. FIG. 9 is a flowchart representing the process of measuring the correction image.

In the color image forming apparatus 100, for example, when the instruction has been given by the user to measure the correction image through the operation section 16, correction image measurement is performed by the overall control section 151.

As shown in FIG. 9, the Steps S21 and S22 are the same as the Steps S11 and S12 for baseline measurement. When the rotational speed is stable (Step S22: Yes), the correction image data of the registration mark CR and density patch PT stored in the nonvolatile memory 14 in advance is read out. Based on the correction data, the toner image for correction image is formed on the intermediate transfer member 6 (Step S23).

The Step S24 is the same as the Step S13 for baseline measurement. A decision is made to see whether or not the intermediate transfer member 6 is properly positioned to detect the correction image by the optical sensors 12A and 12B (Step S25). If it is not positioned for this detection (Step S25: No), the system again goes to the Step S25. If it is properly positioned (Step S25: Yes), a step is taken to detect the surface of the intermediate transfer member 6 with the correction image formed thereon by the optical sensors 12A and 12B. The detection signal of the optical sensors 12A and 12B is discretized by the signal processing section 153, and the sampling data thereof is stored in the RAM154 (Step S26).

Figure 10:
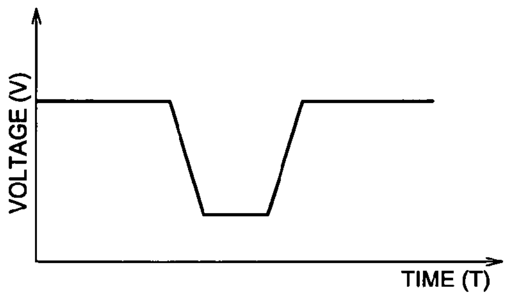
FIG. 10 (*a*) is a diagram representing the ideal output waveform of the optical sensors 12A and 12B at the time of detecting the registration mark CR.
Figure 10:
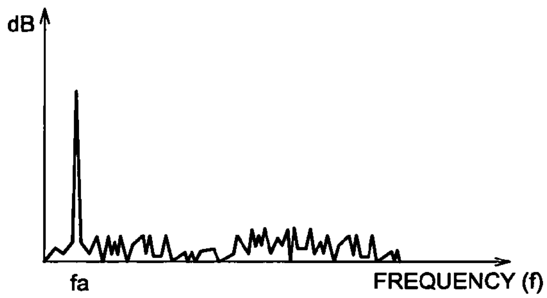
Figure 11:
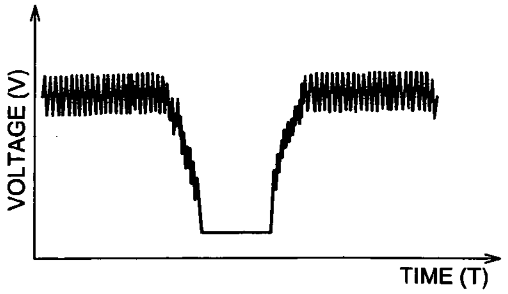
FIG. 11 (*a*) is a diagram representing an example of the practical output waveform of the optical sensors 12A and 12B at the time of detecting the registration mark CR.
Figure 11:
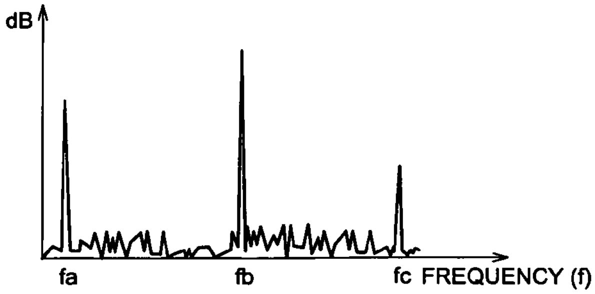

FIG. 10 (*a*) shows the ideal output waveform of the optical sensors 12A and 12B at the time of detecting the registration mark CR. FIG. 11 (*a*) shows an example of the practical output waveform of the optical sensors 12A and 12B at the time of detecting the registration mark CR. As shown in FIG. 10 (*a*), the ideal output voltage of the optical sensors 12A and 12B is concave with respect to time. The actual waveform is as shown in FIG. 11 (*a*).

The Steps S27 and S28 are the same as the Steps S16 and S17 for baseline measurement. The sampling data of the correction image stored in the RAM154 is subjected to frequency analysis (Step S29). To put it more specifically, FFT is applied to the sampling data of the correction image as the voltage component with respect to time, thereby obtaining the waveform of the frequency component with respect to frequency.

FIG. 10 (*b*) shows the frequency-analyzed waveform of the ideal sampling data at the time of detecting the registration mark CR. FIG. 11 (*b*) shows the frequency-analyzed waveform of the practical sampling data at the time of detecting the registration mark CR. As shown in FIG. 10 (*b*), the frequency-analyzed waveform of the ideal sampling data shown in FIG. 10 (*a*) is the frequency fa specific to the time of detecting the registration mark CR, wherein the frequency component is increased. As shown in FIG. 11 (*b*), the frequency-analyzed waveform of the practical sampling data shown in FIG. 11 (*a*) is characterized by increased frequency components of frequency fa, frequency fb of the noise due to a scratch or dust on the intermediate transfer member 6 and frequency fc of electrical noise.

The dominant frequency stored in the nonvolatile memory 14 is read out, and the dominant frequency component is deleted from the sampling data of the frequency-analyzed correction image (Step S30). To put it more specifically, 0 is substituted into the dominant frequency component of the sampling data of the frequency-analyzed correction image.

Figure 12:
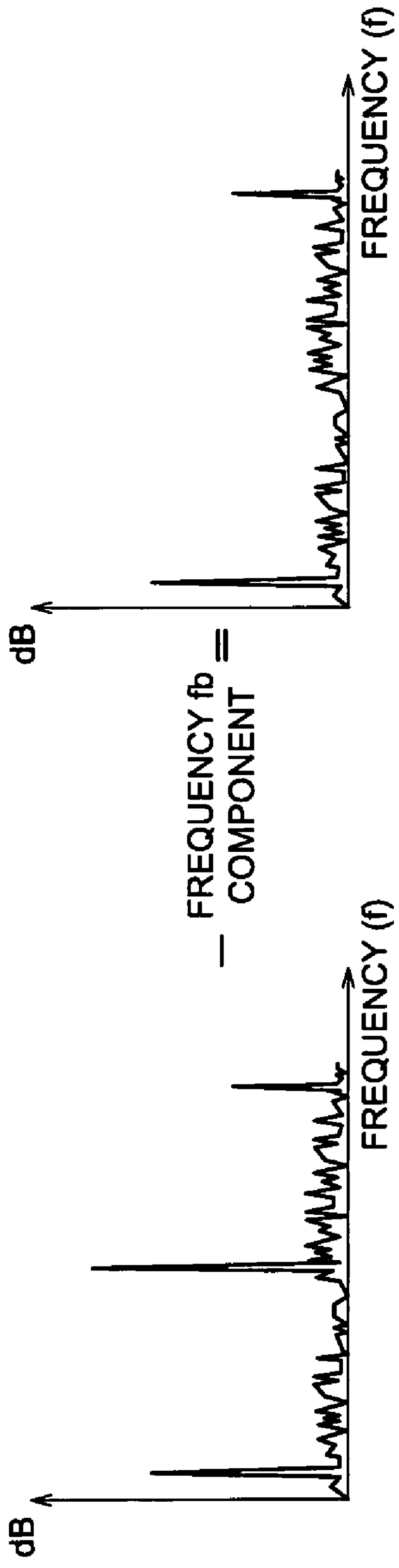
FIG. 12 is a diagram representing an example of detecting the dominant frequency component from the sampling data of the correction image.

FIG. 12 represents an example of detecting the dominant frequency component from the sampling data of the correction image. As shown in FIG. 12, the dominant frequency fb component is deleted from the sampling data frequency-analyzed correction image shown in FIG. 11 (*b*). This will give the sampling data of the frequency-analyzed correction image characterized by increased frequency components of the frequency fa and frequency fc.

Reverse frequency analysis is made to the sampling data of the frequency-analyzed correction image from which the dominant frequency component is deleted (Step S31). To put it more specifically, by applying inverse FFT to the sampling data of the correction image with the frequency component removed with respect to dominant frequency, reverse analysis is made to the sampling data of the correction image of the voltage with respect to time.

Figure 13:
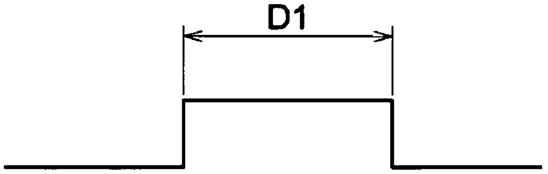
FIG. 13 (*a*) is a diagram representing the binarized pattern detection signal.
Figure 13:
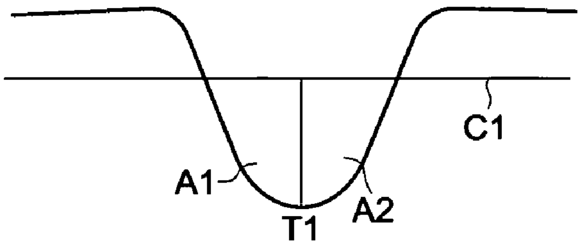
Figure 14:
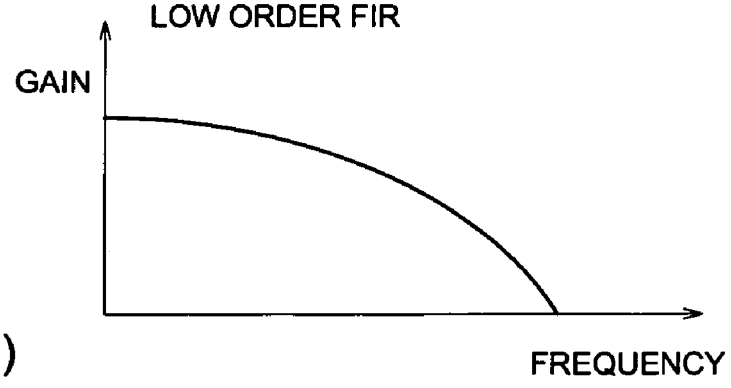
FIG. 14 (*a*) is a diagram representing the gain with respect to frequency in a low-order FIR filter.
Figure 14:
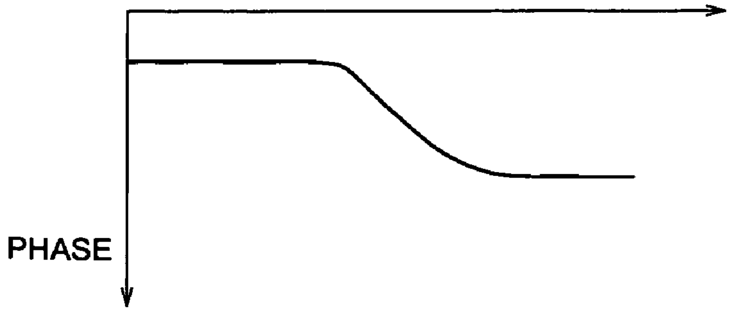
Figure 15:
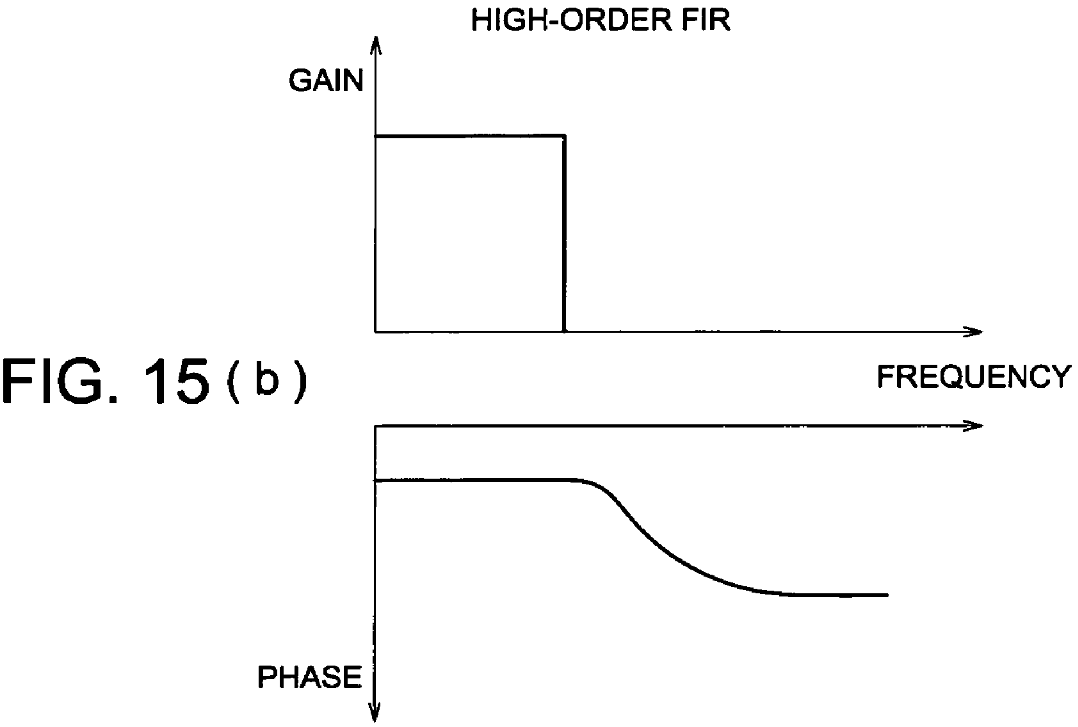
FIG. 15 (*a*) is a diagram representing the gain with respect to frequency in a high-order FIR filter.

In response to the sampling data of the correction image having been subjected to reverse frequency analysis, the position information of the registration mark CR is calculated and is stored in the nonvolatile memory 14 (Step S32). The position information of the registration mark can be calculated, for example, by identifying the position information by detecting the center of gravity. FIG. 13 (*a*) shows the binarized pattern detection signal. FIG. 13 (*b*) shows an example of determining the center position of the pattern detection signal having been detected by the optical sensors 12A and 12B.

FIG. 13 (*a*) shows the binarized detection signal when the pattern with a width D1 (part of registration mark CR) is detected by the digital sensor. Similarly, FIG. 13 (*b*) shows the detection signal when the pattern with a width D1 is detected by the optical sensors 12A and 12B as analog sensors. In FIG. 13 (*a*), information on pattern center position is obtained by calculating the center position of the High component of the detection signal. The digital sensor is characterized by easy calculation of the pattern center position, but is required to provide a smaller spot diameter as a sensor. Accordingly, analog sensors are used as the optical sensors 12A and 12B in the present embodiment.

In FIG. 13 (*b*) showing an example of the present embodiment, an integral in the area between the detection signal and a predetermined line C1 is calculated. This integral is divided into two equal parts, and the position corresponding to the time T1 when the areas of regions A1 and A2 are equal to each other is calculated as the information on pattern center position. In this way, the position information of the registration mark CR is calculated.

In accordance with the sampling data of the correction image having been subjected to reverse frequency analysis, the density information for each patch of the density patch PT is calculated and is stored in the nonvolatile memory 14 (Step S33). The process of correction image measurement is now complete. In Step S33, to put it more specifically, the average value of sampling data for each patch of the density patch PT is calculated, and the average value is identified as the density information of the patch.

Subsequent to correction image measurement, based on the position information of the registration mark CR stored in the nonvolatile memory 14, the main scanning correction volume, sub-scanning correction volume, overall lateral magnification correction volume, partial lateral magnification correction volume and skew correction volume are calculated by the main scanning correction calculating section 1521, sub-scanning correction calculating section 1522, overall lateral magnification correction calculating section 1523, partial lateral magnification correction calculating section 1524, and skew correction calculating section 1525. Then the registration correction LUT is calculated and the registration correction LUT stored in the nonvolatile memory 14 is updated. Based on the main scanning correction volume, sub-scanning correction volume, overall lateral magnification correction volume, partial lateral magnification correction volume and skew correction volume, the processes of main scanning correction, sub-scanning correction, overall lateral magnification correction, partial lateral magnification correction and skew correction are implemented as steps of correcting the image formation by the main scanning start timing control section 1551, sub-scanning start timing control section 1552, pixel clock cycle control section 1553, write unit drive section 1554 and image forming unit drive section 1555.

After correction image measurement, based on the density information stored in the nonvolatile memory 14, the gradation correction volume (gradation correction LUT) is calculated by the gradation correction calculating section 1526. The gradation correction volume stored in the nonvolatile memory 14 is updated. Based on the gradation correction volume, gradation correction is implemented by the gradation control section 1556.

According to the present embodiment, at the time of baseline measurement, the surface of the intermediate transfer member 6 without an image formed thereon is detected by the optical sensors 12A and 12B. The detection signal of the baseline is discretized, and is subjected to frequency analysis. The dominant frequency corresponding to the noise due to a scratch or dust on the intermediate transfer member 6 is extracted from the analysis sign. Thus, this dominant frequency is used as the detection signal of the correction image. This procedure ensures easy and high-precision deletion of the dominant frequency component of the noise due to a scratch or dust on the intermediate transfer member 6, from the detection signal of the correction image.

The dominant frequency from the baseline detection signal is extracted within a predetermined frequency range. This procedure reduces the time of extracting the dominant frequency, as compared to the case where the dominant frequency is extracted from all the frequencies.

At the time of correction image measurement, the correction image is formed on the intermediate transfer member 6, and the surface of the intermediate transfer member 6 is detected by the optical sensors 12A and 12B. Then the detection signal of the baseline undergoes discretization and frequency analysis. The dominant frequency component of the noise due to a scratch or dust on the intermediate transfer member 6 is detected from the analysis signal. This procedure allows easy and high-precision deletion of the dominant frequency component of the noise due to a scratch or dust on the intermediate transfer member 6, from the detection signal of the correction image.

Density-information is calculated in accordance with the detection signal obtained by detection of the density patch PT of the correction image, wherein that the dominant frequency component is deleted from the detection signal. Based on the density information thereof, gradation correction volume can be calculated by the gradation correction calculating section 1526, and the gradation correction volume (gradation correction LUT) stored in the nonvolatile memory 14 can be updated. In particular, this procedure ensures satisfactory deletion of the dominant frequency component of the noise due to a scratch or dust corresponding to the density portion of smaller density patch PT characterized by a conspicuous scratch or dust on the intermediate transfer member 6.

The position information of the registration mark CR is calculated in response to the detection signal wherein the dominant frequency component calculated by detection of the registration mark CR of the correction image is deleted. Thus, based on the position information of the registration mark CR, the registration correction volume can be calculated by the correction volume computing section 152, and registration correction volume (registration correction LUT) stored in the nonvolatile memory 14 can be updated.

The description of the aforementioned embodiment refers to only an example of the preferred signal processing apparatus and image forming apparatus of the present invention, without the present invention being restricted thereto.

For example, in the aforementioned embodiment, the frequency corresponding to the noise resulting from a scratch or dust on the intermediate transfer member 6 is extracted as a dominant frequency. Without being restricted thereto, for example, the frequency corresponding to electrical noise can be extracted as the dominant frequency.

In the aforementioned embodiment, a correction image is formed on to the intermediate transfer member 6 as a recording medium. However, for example, a correction image can be formed on a recording sheet such as recording paper or OHP sheet, and the recording sheet is detected by an optical sensor. The dominant frequency component is deleted from the detection signal.

Details of the structure and operation in the color image forming apparatus 100 in the aforementioned embodiment can be embodied in a great number of variations with appropriate modification or additions, without departing from the technological spirit and scope of the invention claimed.

What is claimed is:

1. A signal processing apparatus comprising:

an optical sensor for outputting a detection signal by detecting a surface of a recording medium on which a correction image is to be formed; and a control section configured to conduct control steps of:

having said optical sensor to detect the surface of the recording medium without the correction image being formed thereon;

making a frequency analysis of a first detection signal outputted from said optical sensor detecting the surface of the recording medium without the correction image being formed thereon;

extracting a dominant frequency corresponding to the frequency component dominant over other values from a first analysis signal obtained by making the frequency analysis of the first detection signal;

having said optical sensor to detect the surface of the recording medium with the correction image formed thereon;

making a frequency analysis of a second detection signal outputted from said optical sensor detecting the surface of the recording medium with the correction image being formed thereon;

deleting the component of the extracted dominant frequency from a second analysis signal obtained by making the frequency analysis of the second detection signal; and obtaining a detection signal, in which the dominant frequency component has been deleted by making reverse frequency analysis of the second analysis signal from which the dominant frequency component has been deleted.

2. The signal processing apparatus according to claim 1, wherein said control section is configured to conduct the extracting step by extracting dominant frequency corresponding to noise due to a scratch or dust on an intermediate transfer member from the first analysis signal.

3. The signal processing apparatus according to claim 1, wherein the correction image includes a density patch for density correction in an image forming operation and wherein said control section calculates density information in accordance with a detection signal obtained by detecting the density patch wherein the dominant frequency has been deleted from the detection signal.

4. The signal processing apparatus according to claim 1, wherein the correction image includes a registration mark for registration correction in an image formation and wherein said control section calculates position information of the registration mark in accordance with a detection signal obtained by detecting the registration mark wherein the dominant frequency has been deleted from the detection signal.

5. The signal processing apparatus according to claim 1, wherein said control section calculates correction information for correcting image formation in accordance with the detection signal wherein the dominant frequency component has been deleted.

6. The signal processing apparatus according to claim 1, wherein the recording medium is an intermediate transfer member.

7. An image forming apparatus comprising:

an image forming section for forming an image on a recording medium; and a signal processing apparatus, including:

an optical sensor for outputting a detection signal by detecting a surface of the recording medium on which a correction image is to be formed by said image forming section; and a control section which conducts control steps of:

having said optical sensor to detect the surface of the recording medium without the correction image being formed thereon;

making a frequency analysis of a first detection signal outputted from said optical sensor detecting the surface of the recording medium without the correction image being formed thereon;

extracting a dominant frequency corresponding to the frequency component dominant over other values from a first analysis signal obtained by making the frequency analysis of the first detection signal;

having said optical sensor to detect the surface of the recording medium with the correction image formed thereon;

making a frequency analysis of a second detection signal outputted from said optical sensor detecting the surface of the recording medium with the correction image being formed thereon;

deleting the component of the extracted dominant frequency from a second analysis signal obtained by making the frequency analysis of the second detection signal; and obtaining a detection signal, in which the dominant frequency component has been deleted by making reverse frequency analysis of the second analysis signal from which the dominant frequency component has been deleted.

8. The image forming apparatus according to claim 7, wherein the correction image includes a density patch for density correction in an image forming operation and wherein said control section calculates density information in accordance with a detection signal obtained by detecting the density patch wherein the dominant frequency has been deleted from the detection signal and wherein said image forming section forms an image in accordance with the calculated density information.

9. The image forming apparatus according to claim 7, wherein the correction image includes a registration mark for registration correction in an image formation and wherein said control section calculates position information of the registration mark in accordance with a detection signal obtained by detecting the registration mark wherein the dominant frequency has been deleted from the detection signal and wherein said image forming section forms an image in accordance with the calculated position information.

10. The image forming apparatus according to claim 7, wherein said control section calculates correction information for correcting image formation in accordance with the detection signal wherein the dominant frequency component has been delete and wherein said image forming section forms an image in accordance with the calculated correction information.

11. The image forming apparatus according to claim 7, wherein the recording medium is an intermediate transfer member.

* * * * *